US011036774B2

(12) United States Patent
Zhao et al.

(10) Patent No.: US 11,036,774 B2
(45) Date of Patent: Jun. 15, 2021

(54) KNOWLEDGE-BASED QUESTION ANSWERING SYSTEM FOR THE DIY DOMAIN

(71) Applicant: Robert Bosch GmbH, Stuttgart (DE)

(72) Inventors: Lin Zhao, Sunnyvale, CA (US); Zhe Feng, Mountain View, CA (US); Doo Soon Kim, San Jose, CA (US)

(73) Assignee: Robert Bosch GmbH, Stuttgart (DE)

( * ) Notice: Subject to any disclaimer, the term of this patent is extended or adjusted under 35 U.S.C. 154(b) by 232 days.

(21) Appl. No.: 16/151,835

(22) Filed: Oct. 4, 2018

(65) Prior Publication Data

US 2020/0110835 A1    Apr. 9, 2020

(51) Int. Cl.
*G06F 16/00* (2019.01)
*G06N 5/00* (2006.01)
(Continued)

(52) U.S. Cl.
CPC ........ *G06F 16/3329* (2019.01); *G06F 16/243* (2019.01); *G06F 16/3344* (2019.01);
(Continued)

(58) Field of Classification Search
CPC .. G06F 16/3329; G06F 16/243; G06F 16/285; G06F 16/36; G06F 16/3344; G06F 16/367; G06F 16/90332; G06F 16/24522; G06F 40/30; G06F 40/40; G06F 40/20; G06F 40/205; G06F 40/211; G06F 40/56; G06F 16/2423; G06F 16/90335; G06F 16/33; G06F 16/332; G06F 16/334; G06F 16/9535; G06Q 30/0601; G06Q 30/016; G06Q 10/10; G06N 20/00; G06N 5/04;
(Continued)

(56) References Cited

U.S. PATENT DOCUMENTS

| | | | |
|---|---|---|---|
| 6,289,513 B1 * | 9/2001 | Bentwich | G06F 8/30 717/106 |
| 7,844,594 B1 * | 11/2010 | Holt | G06F 16/345 707/709 |

(Continued)

OTHER PUBLICATIONS

Ashwin Uday Bhatkal et al., "Knowledge based Question and Answering system using user feedback", 3rd IEEE International Conference on Recent Trends in Electronics, Information & Communication Technology (RTEICT), May 18-19, 2018, pp. 2599-2603.*

(Continued)

*Primary Examiner* — Srirama Channavajjala
(74) *Attorney, Agent, or Firm* — Maginot, Moore & Beck LLP

(57) ABSTRACT

DIY (Do-It-Yourself) is challenging for many novices, requiring extensive knowledge such as the usage of particular tools and the properties of the required materials. Many DIYers use web searches to find relevant information and instructions, but web search is time-consuming and the results often do not fit the DIYers' specific needs. To address these problems, we present a Question Answering (QA) system that can assist DIYers through the whole cycle of a DIY project. Given a natural language question about a DIY project, the QA system described herein provides an answer along with the explanations that are tailored to the DIYers' specific needs.

20 Claims, 10 Drawing Sheets

(51) Int. Cl.

| | |
|---|---|
| *G06F 16/332* | (2019.01) |
| *G06F 16/33* | (2019.01) |
| *G06F 16/9535* | (2019.01) |
| *G06N 5/02* | (2006.01) |
| *G06F 16/242* | (2019.01) |
| *G06F 16/36* | (2019.01) |
| *G06F 16/9032* | (2019.01) |
| *G06F 40/56* | (2020.01) |

(52) U.S. Cl.
CPC ...... *G06F 16/367* (2019.01); *G06F 16/90332* (2019.01); *G06F 16/9535* (2019.01); *G06F 40/56* (2020.01); *G06N 5/02* (2013.01); *G06N 5/022* (2013.01)

(58) Field of Classification Search
CPC . G06N 5/022; G06N 5/00; G06N 5/02; G10L 15/18; G10L 15/1815; G10L 15/1822; G16H 10/20
See application file for complete search history.

(56) References Cited

U.S. PATENT DOCUMENTS

| | | | |
|---|---|---|---|
| 8,898,159 B2 | 11/2014 | Brown et al. | |
| 9,213,771 B2* | 12/2015 | Chen | G06F 16/3329 |
| 9,582,757 B1* | 2/2017 | Holmes | G06N 3/006 |
| 9,805,718 B2* | 10/2017 | Ayan | H04M 3/4936 |
| 9,858,828 B1* | 1/2018 | Fuka | G09B 7/00 |
| 2004/0220969 A1* | 11/2004 | Cho | G06N 5/022 |
| 2005/0038821 A1* | 2/2005 | Wallen | G05B 19/4097 |
| 2008/0294637 A1* | 11/2008 | Liu | G06Q 30/0601 |
| 2010/0030712 A1* | 2/2010 | Passovoy | G06N 5/04 706/11 |
| 2011/0153312 A1* | 6/2011 | Roberts | G06F 16/3329 704/9 |
| 2013/0029308 A1* | 1/2013 | Graesser | G06Q 30/02 434/327 |
| 2013/0325779 A1* | 12/2013 | Shahshahani | G06N 5/00 706/46 |
| 2014/0214831 A1* | 7/2014 | Chi | G06Q 10/10 707/737 |
| 2014/0365518 A1* | 12/2014 | Calo | G06F 16/243 707/760 |
| 2015/0161241 A1* | 6/2015 | Haggar | G06F 16/3329 707/723 |
| 2015/0339299 A1* | 11/2015 | Bagchi | G06F 16/3346 707/728 |
| 2016/0180216 A1* | 6/2016 | Allen | G09B 7/02 706/46 |
| 2016/0196312 A1* | 7/2016 | Bastide | G06F 40/30 707/776 |
| 2017/0032251 A1* | 2/2017 | Podgorny | G06Q 30/016 |
| 2017/0228372 A1* | 8/2017 | Moreno | G06F 16/3329 |
| 2017/0293725 A1* | 10/2017 | Liu | G06F 40/30 |

OTHER PUBLICATIONS

Sameerchand Pudaruth et al., "An intelligent question answering system for ICT", International Conference on Electrical, Electronics, and Optimization Techniques (ICEEOT), Mar. 3-5, 2016, pp. 2895-2899.*

Wang, Y. et al., "A Logic Based Approach to Answering Questions about Alternatives in DIY Domains," in AAAI, pp. 4753-4759, 2007 (6 pages).

Hao, Y. et al., "An End-to-End Model for Question Answering over Knowledge Base with Cross-Attention Combining Global Knowledge," In Proceedings of the 55th Annual Meeting of the Association for Computational Linguistics (vol. 1: Long Papers), vol. 1, pp. 221-231, 2017 (11 pages).

Andrenucci, A. et al., "Automated Question Answering: Review of the Main Approaches," In Third International Conference on Information Technology and Applications (ICITA 2005), 2005 (6 pages).

Yoon, K., "Convolutional Neural Networks for Sentence Classification," In Proceedings of the 2014 Conference on Empirical Methods in Natural Language Processing (EMNLP), 2014 (6 pages).

Turney, P. D. et al., "From Frequency to Meaning: Vector Space Models of Semantics," Journal of Artificial Intelligence Research, vol. 37, pp. 141-188, 2010 (48 pages).

He, S. et al., "Generating Natural Answers by Incorporating Copying and Retrieving Mechanisms in Sequence-to-Sequence Learning," In Proceedings of the 55th Annual Meeting of the Association for Computational Linguistics, pp. 199-208, 2017 (10 pages).

Hirschman, L. et al., "Natural language question answering: the view from here," Natural Language Engineering, vol. 7, pp. 275-300, 2001 (26 pages).

Bordes, A. et al., "Question Answering with Subgraph Embeddings," In Proceedings of the 2014 Conference on Empirical Methods in Natural Language Processing (EMNLP), 2014 (9 pages).

Giunchiglia, F. et al., "Semantic Matching: Algorithms and Implementation," Springer Berlin Heidelberg, 2007 (44 pages).

Yih, W. et al., "Semantic Parsing via Staged Query Graph Generation: Question Answering with Knowledge Base," In Association for Computational Linguistics (ACL), pp. 1321-1331, 2015 (12 pages).

Jurafsky, D. et al., "Speech and Language Processing: an Introduction to Natural Language Processing, Computational Linguistics, and Speech Recognition," Chapter 1, Second Edition, Pearson, 2014 (17 pages).

Misu, T. et al., "Speech-Based Interactive Information Guidance System Using Question-Answering Technique," ICASSP, pp. IV-145-IV-148, 2007 (4 pages).

Jansen, P. et al., "What's in an Explanation? Characterizing Knowledge and Inference Requirements for Elementary Science Exams," Proceedings of Coling 2016, the 26th International Conference on Computational Linguistics: Technical Papers, pp. 2956-2965, 2016 (10 pages).

* cited by examiner

| Question Type | Sub-question type | Example |
|---|---|---|
| Project Question | required entities / properties | What power tools do I need in the project? |
| | | What is the length of the drill bit needed in the project? |
| | alternative entities | Can I use a circular saw instead of a jigsaw in step 2? |
| | time / difficulty / cost | How long does the project take? |
| | explanation of actions | Can you explain the sawing step in more detail? |
| | specific location of actions | Where should it be screwed? |
| | alternative actions | Are there other options instead of pre-drilling? |
| Domain Question | definition of tool / accessory / material | What is jigsaw? |
| | related action | What can I do with a jigsaw? |
| | tips | Is there any safety tip for using a jigsaw? |
| | structural info | What does a jigsaw look like? |
| | comparison | How does a jigsaw differ from a circular saw? |

FIG. 9

KNOWLEDGE-BASED QUESTION ANSWERING SYSTEM FOR THE DIY DOMAIN

FIELD

The device and method disclosed in this document relates to question answering and, more particularly, to question answering in the do-it-yourself domain using a knowledge base.

BACKGROUND

Unless otherwise indicated herein, the materials described in this section are not prior art to the claims in this application and are not admitted to the prior art by inclusion in this section.

Question answering (QA) aims to provide precise and instant answers to people's natural language questions. It is a key feature in an Intelligent Personal Assistant such, as Siri or Google Assistant. A question answering service can be applied to either open domain or vertical applications, e.g., banking, healthcare, e-commerce, etc. It can satisfy the users' information needs in an efficient and interactive way. Compared to web search engines, question answering systems have the advantage of saving significant time and effort for the users.

However, question answering is a challenging AI task because both understanding and answering questions requires solving complex AI problems. Most existing question answering systems focus on providing answers to factoid questions in which a user inquires about factual information regarding a person, place, thing, or the like. Exemplary factoid questions might include: "Who is the president of United States?" or "When was president Obama born?" Such factoid questions are relatively easy to answer. However, non-factoid questions typically require more complex knowledge or advanced reasoning techniques to answer. As a result, non-factoid questions are much more difficult to answer and have not been handled very well by current question answering systems.

There have been two major approaches for QA, Information Retrieval (IR)-based approaches and Knowledge Base (KB)-based approaches. IR-based approaches retrieve answers from text documents or web pages. They perform well for limited types of questions and only work when the answer explicitly exists in the text. In contrast, KB-based approaches retrieve the answers from structured KB which contains pieces of knowledge about the target domain. The KB can be built either manually by domain experts or leveraging some NLP techniques for speed up. Compared to IR-based approach, KB-based approach can provide more precise answers and also work for the cases where the answers cannot be explicitly found in the documents.

SUMMARY

A method of answering natural language questions is disclosed. The method comprises: storing, in a memory of a server, a knowledge base having a plurality of knowledge representations, each knowledge representation describing a particular topic and defining at least two entities and at least one relationship between the at least two entities, a first subset of the plurality of knowledge representations describing objects including at least one of tools, accessories for the tools, and materials, a second subset of the plurality of knowledge representations each describing actions that can be performed with the at least one of the tools, the accessories for the tools, and the materials, a third subset of the plurality of knowledge representations describing step-by-step instructions for particular projects that can be completed with the at least one of the tools, the accessories for the tools, and the materials; receiving, with a transceiver of the server, a natural language question from a client device; determining, with a processor of the server, a question type from a predetermined set of possible question types to which the of the natural language question corresponds; retrieving, with the processor, data from the knowledge base using a query template having a form that depends on the determined question type of the natural language question and a content of the natural language question; generating, with the processor, an answer based on the retrieved data from the knowledge base; and transmitting, with the transceiver, the answer to the client device, the answer being perceptibly output by the client device.

BRIEF DESCRIPTION OF THE DRAWINGS

The foregoing aspects and other features of a question answering system are explained in the following description, taken in connection with the accompanying drawings.

FIG. 9 shows a table describing a set of exemplary question types.

DETAILED DESCRIPTION

Figure 1:
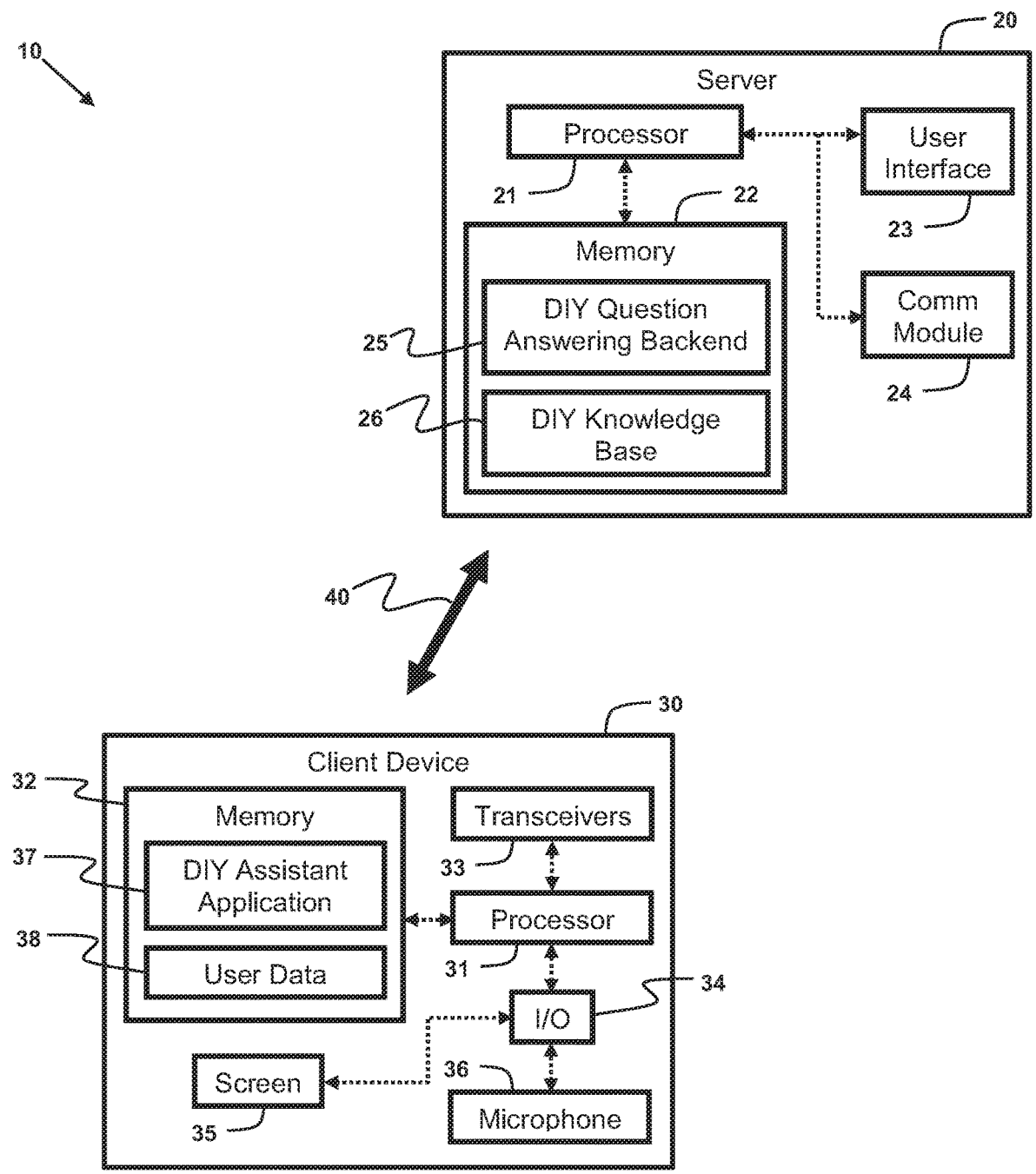
FIG. 1 shows exemplary components of a question answering system.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

A question answering system for the do-it-yourself (DIY) and power tool domains is disclosed herein. DIY projects offer various advantages, such as cost savings and a sense of achievement for the person completing the DIY project (sometimes referred to herein as the "DIYer"). Exemplary DIY projects include projects such as building a table, repairing a chair, or refurbishing a house. DIY projects are not always easy tasks for novices and there are several reasons for that. First, many articles teaching how to complete a DIY project are too difficult for the novices to understand, often presenting the contents at a too-high level using technical jargons without sufficiently detailed guidance. Second, DIYers typically use the Internet to look for the necessary knowledge to complete a project, but the retrieved information is often too generalized and it is still up to the DIYers to adapt the generic knowledge to their specific situation and this adaptation itself is challenging. Third, there is no one-stop and easy-to-access service that provides professional DIY assistance. Instead, DIYers generally must search through web tutorials, discussion forums, or other web pages to find the answers, but it is time-consuming and requires too much efforts. Fourth, DIY projects often require access to specific power tools, but it is difficult for the DIYer to determine exactly what tools he or she needs. For these reasons, DIY projects are often challenging tasks and require a lot of expertise to plan or perform.

To tackle these problems, a KB-based QA system is disclosed which provides QA service for DIY projects available at a DIY assistant application or website via a client device. However, it will be appreciated that developing a QA system for the DIY domain presents several unique challenges. Particularly, many types of questions in the DIY domain are complex and answering these questions requires deep understanding of the project and domain knowledge beyond simply retrieving the factual information. However, most QA systems focus on factoid questions and, thus, their approaches cannot be directly applied to the DIY domain. Particularly, in conventional factoid-centric QA systems, candidate answers to factoid questions are generally stored explicitly in the KB. However, the QA system described herein generates answers on the fly by combining different types of knowledge from the KB, because it is impractical to store all the possible answers for the broad array of possible DIY questions in advance. For example, to answer a question such as "What is the difference between tool A and B?", the QA system described herein works by retrieving the properties of A and B from the KB and then performs a comparison, instead of actually storing the difference of A and B in the KB. Additionally, conventional factoid-centric QA systems generally will always produce the same answer for the same question regardless of the context. However, the QA system described herein dynamically adjusts the answers depending on the user and the context, such as DIYer's personal information, skill level, project-related constraints, etc. Finally, conventional factoid-centric QA systems generally provide an answer without explanation. However, the QA system described herein is able to provide explanations in addition to the answers, in order to make the system more trustable.

System Overview

With reference to FIG. 1, an exemplary embodiment of question answering system 10 for the DIY domain is described. In the illustrated embodiment, the question answering system 10 includes a server 20 and one or more client devices 30. The client device 30 (which may also be referred to herein as a "personal electronic device") may be a desktop computer, a laptop, a smart phone, a tablet, a personal digital assistant (PDA), a smart watch or other wearable smart device, and/or a smart power tool. The client device 30 is configured to enable a user to ask a natural language question in the DIY domain and transmit the question to the server 20 for processing. The server 20 is configured to receive the natural language question from the client device 30 and process the question to determine an appropriate answer, which is transmitted back the client device 30. The client device 30 is configured to receive the answer from the server 20 and to present the answer to the user.

The server 20 and the client device 30 are configured to communicate with one another via one or more networks 40. The network 40 can comprise one or more sub-networks that work in concert to enable communication between the server 20 and the client device 30. The network 40 may comprise, in part, one or more pre-existing wired or wireless networks such as local area networks, the Internet, telephony networks, or any combination thereof. It will be appreciated that, although the question answering system 10 is described as having a distinct server 20 and client device 30, in some embodiments a single computing device (not shown) may include the combined components and features of both the server 20 and the client device 30

With continued reference to FIG. 1, exemplary components of the server 20 are shown. In the illustrated embodiment, the server 20 includes at least one processor 21, memory 22, a user interface 23, and a network communications module 24. It is appreciated that the illustrated embodiment of the server 20 is only one exemplary embodiment of a server 20 and is merely representative of any of various manners or configurations of a server, remote computer, or any other data processing systems that are operative in the manner set forth herein.

The processor 21 may be any of various processors as will be recognized by those of ordinary skill in the art. It will be recognized by those of ordinary skill in the art that a "processor" as used herein includes any hardware system, hardware mechanism or hardware component that processes data, signals, and/or other information. The processor 21 can include a system with a central processing unit, multiple processing units, dedicated circuitry for achieving functionality, and/or other systems. Exemplary processors include microprocessors (µP), microcontrollers (µC), digital signal processors (DSP), graphics processing unit (GPU), or any combination thereof. The processor 21 is operably connected to the memory 22, a user interface 23, and a network communications module 24.

The server 20 may be operated locally or remotely by a user. To facilitate local operation, the server 20 may include an interactive user interface 23. Via the user interface 23, a user may modify and/or update program instructions stored on the memory 22, as well as collect data from and store data to the memory 22. In one embodiment, the user interface 23 may suitably include an LCD display screen or the like, a mouse or other pointing device, a keyboard or other keypad, speakers, and a microphone, as will be recognized by those of ordinary skill in the art. Alternatively, in some embodiments, a user may operate the server 20 remotely from another computing device which is in communication therewith via the network communications module 24 and has an analogous user interface.

The network communications module 24 of the server 20 provides an interface that allows for communication with any of various devices or networks and at least includes transceivers or other hardware configured to communicate with the client devices 30. In particular, the network communications module 24 may include a local area network port that allows for communication with any of various local computers housed in the same or nearby facility. In some embodiments, the network communications module 24 further includes a wide area network port that allows for communications with remote computers over the Internet. Alternatively, the server 20 communicates with the Internet via a separate modem and/or router of the local area network. In one embodiment, the network communications module 24 is equipped with a Wi-Fi transceiver or other wireless communications device. Accordingly, it will be appreciated that communications with the server 20 may occur via wired communications or via the wireless communications. Communications may be accomplished using any of various known communications protocols.

The memory 22 of the server 20 is configured to store information, including both data and instructions. The memory 22 may be of any type of device capable of storing information accessible by the processor 21, such as a memory card, ROM, RAM, write-capable memories, read-only memories, hard drives, discs, flash memory, or any of various other computer-readable medium serving as data storage devices as will be recognized by those of ordinary skill in the art. The memory 22 is configured to store program instructions that, when executed by the processor 21, enable the server 20 to provide the features, functionality, characteristics and/or the like as described herein. Particularly, the memory 22 includes a DIY question answering backend 25 that enables processing natural language questions received from the client device 30 and to determining an appropriate answer to the natural language question based on a DIY knowledge base 26, which is also stored in the memory 22. The DIY knowledge base 26 comprises structured and/or partially structured knowledge in the DIY domain. In one embodiment, the DIY knowledge base 26 is stored using a semantic web platform, such as Stardog. The DIY question answering backend 25 and the DIY knowledge base 26 are described in greater detail below.

With continued reference to FIG. 1, exemplary components of the client device 30 are shown. In the illustrated embodiment, the client device 30 comprises a processor 31, a memory 32, transceivers 33, an I/O interface 34, a display screen 35, and a microphone 36. It is appreciated that the illustrated embodiment of the client device 30 is only one exemplary embodiment of a client device 30 and is merely representative of any of various manners or configurations of a client device, a personal electronic device, or other device that is operative in the manner set forth herein.

The processor 31 may be any of various processors as will be recognized by those of ordinary skill in the art. It will be recognized by those of ordinary skill in the art that a "processor" as used herein includes any hardware system, hardware mechanism or hardware component that processes data, signals, and/or other information. The processor 31 can include a system with a central processing unit, multiple processing units, dedicated circuitry for achieving functionality, and/or other systems. Exemplary processors include microprocessors (μP), microcontrollers (μC), digital signal processors (DSP), graphics processing unit (GPU), or any combination thereof. The processor 31 is operably connected to the memory 32, the transceivers 33, the I/O interface 34, the display screen 35, and the microphone 36.

The transceivers 33 at least includes a transceiver, such as a Wi-Fi transceiver, configured to communicate with the server 20 via the network 40, but may also include any of various other devices configured for communication with other electronic devices, including the ability to send communication signals and receive communication signals. In one embodiment, the transceivers 33 further include additional transceivers which are common to smart phones, smart watches, laptop computers, tablet computers, desktop computers, such as Bluetooth transceivers, Ethernet adapters, and transceivers configured to communicate via wireless telephony networks.

The I/O interface 34 includes software and hardware configured to facilitate communications with the one or more interfaces of the client device 30 including the display screen 35 and the microphone 36, as well as other interfaces such as tactile buttons, switches, toggles, speakers, and/or connection ports. The display screen 35 may be an LCD screen or any of various other screens appropriate for a personal electronic device. The I/O interface 34 is in communication with the display screen 35 and is configured to visually display graphics, text, and other data to the user via the display screen 35. In some embodiments, the microphone 36 is configured to record the voice of a user asking a natural language question to be answered using the question answering system. In further embodiments, the user types the natural language question using a virtual keyboard on the display screen 35 or a physical keyboard connected to the I/O interface 34.

The memory 32 of the server 20 is configured to store information, including both data and instructions. The memory 32 may be of any type of device capable of storing information accessible by the processor 31, such as a memory card, ROM, RAM, write-capable memories, read-only memories, hard drives, discs, flash memory, or any of various other computer-readable medium serving as data storage devices as will be recognized by those of ordinary skill in the art. The memory 32 is configured to store program instructions that, when executed by the processor 31, enable the client device 30 to provide the features, functionality, characteristics and/or the like as described herein. Particularly, the memory 32 includes a DIY assistant application 37 that enables a user to ask a natural language question in the DIY domain and to receive a corresponding answer to the natural language question provided from the server 20. It will be appreciated that the DIY assistant application 37 may be natively executed application or a web application that is executed via a web browser. In one embodiment, the memory 32 is also configured to store user data 37 which includes various types of information related to the user, such as age, skill level, a list of tools that the user has access to, and information regarding a current DIY project of the user and previous DIY projects of the user.

Figure 2:
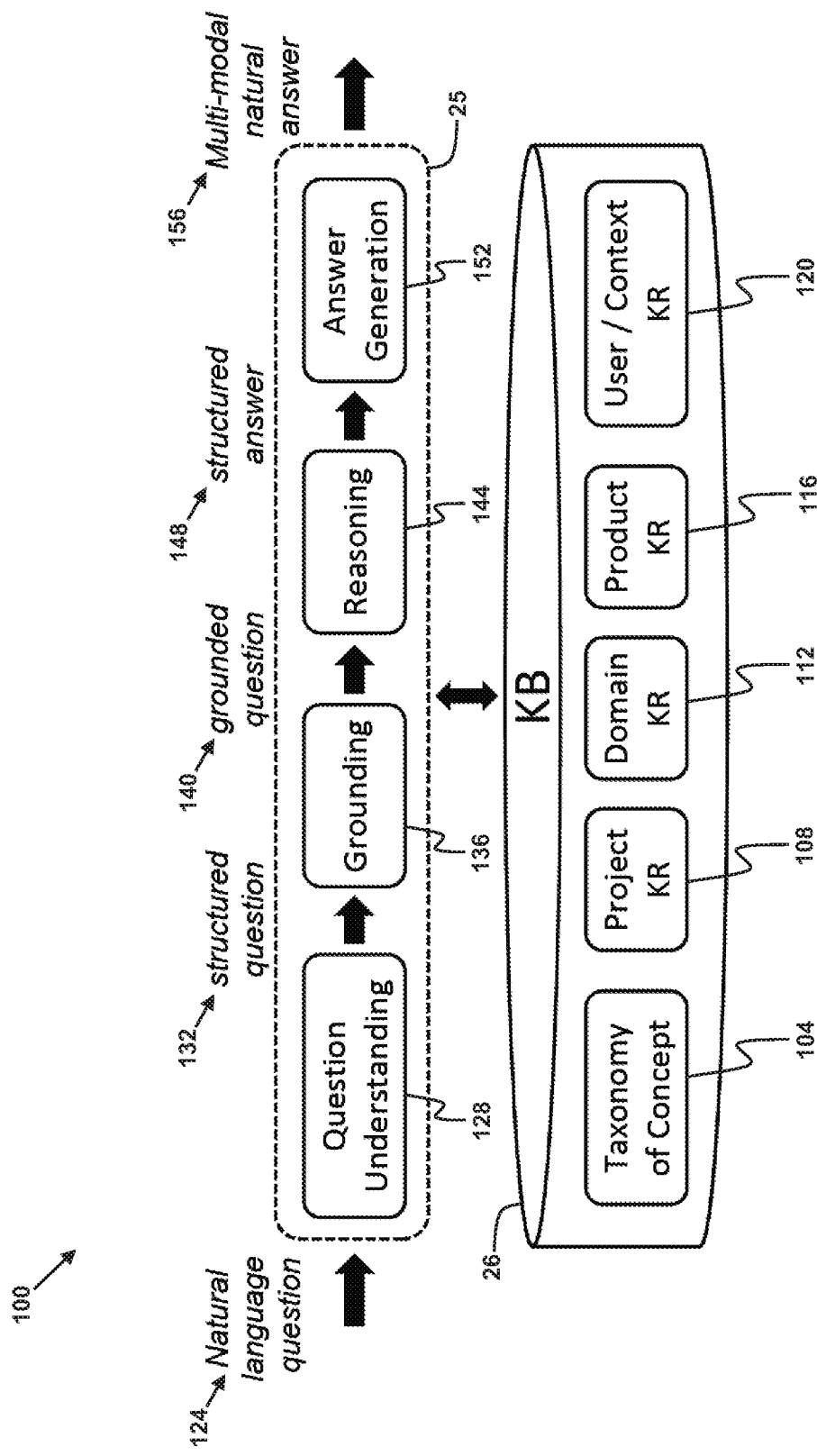
FIG. 2 shows the architecture of the question answering system of FIG. 1.

FIG. 2 illustrates the architecture 100 of the question answering system 10. The architecture 100 is comprised of the DIY question answering backend 25 and the DIY knowledge base 26, which are stored in the memory 22 of the server 20. The processor 21 of the server 20 is configured to execute program instructions of the DIY question answering backend 25 and to query data from the DIY knowledge base 26 to implement the functions and features of the architecture 100. However, it will be appreciated that the certain processes of the DIY question answering backend 25 may be performed instead at the client device 30 by the processor 31 executing program instructions of the DIY assistant application 37. The knowledge representation schemes utilized by the DIY knowledge base 26 are first discussed below, followed by descriptions of the processes used by the DIY question answering backend 25 to answer questions using the DIY knowledge base 26.

DIY Knowledge Base

The DIY knowledge base 26 defines at least two components: (1) a plurality of entities or concepts and (2) a plurality of relationships between the entities or concepts. However, unlike many conventional knowledge bases, which have broad but shallow knowledge of simple facts about entities (e.g., birthplace of a person, founder of a company, capital of a country), the DIY knowledge base 26 is a closed domain knowledge base having deep, complex knowledge representations that support answering complex questions in the DIY domain.

As used herein, the term "knowledge representation" refers to a dataset and/or a portion thereof defining a plurality of entities and at least one relationship between two or more of the entities, generally relating to an individual concept, topic, or subject. As used herein, the term "knowledge base" refers to database including a collection of individual knowledge representations. The entities may correspond to individual things, actions, concepts, properties, or the like. In some embodiments, a knowledge representation and/or a knowledge base may take the form of one or more lists or tables that define a data tree or data web in which the entities comprise the nodes of the tree or web and the relationships comprise the connections between the nodes of the tree or web. In some embodiments, the entities and/or relationships are stored as a list or table of triplets formed as, for example, [entity_ID1, relationship_type, entity_ID2] where entity_ID1 is a first entity or reference thereto, entity_ID2 is a second entity or reference thereto, and relationship_type indicates the nature of the relationship. However, the knowledge base or knowledge representation can take any other suitable form.

In the illustrated embodiment, the DIY knowledge base 26 comprises a taxonomy of concepts 104 and several different types of knowledge representations (KR). Particularly, as shown, the DIY knowledge base 26 includes project knowledge representations (project KR) 108, domain knowledge representations (domain KR) 112, product knowledge representations (product KR) 116, and user/context knowledge representation(s) (user/context KR) 120. However, in some embodiments, the DIY knowledge base 26 may include additional or different types of knowledge representations. The different types of knowledge representations are inter-connected to one another and therefore can be combined to answer more complex questions.

The taxonomy of concepts 104 defines a plurality of concepts, terms, and/or phrases which are relevant to the DIY domain. Particularly, the taxonomy of concepts 104 at least defines a plurality of entity concepts (i.e., nouns) and a plurality of action concepts (i.e., verbs) that are relevant to and/or used in the DIY domain. In one example, the taxonomy of concepts 104 defines about 300 entity concepts and 150 action concepts. The entity concepts include the common objects used in the DIY domain, such as tools (e.g., JIGSAW, DRILL, POWER-SANDER, or HAMMER), accessories (e.g., DRILL-BIT or SAW-BLADE) and materials (e.g., WOOD-SCREW, WOOD-GLUE, or NAIL). The action concepts include common actions performed in the DIY domain, such the common steps performed while completing DIY projects (e.g., SAWING, DRILLING, or GLUING), as well as tool-related actions (e.g., REPLACING-BLADE or CHANGING-BLADE-DEPTH). In some embodiments, the taxonomy of concepts 104 defines further types of concepts aside from entity and action concepts, such as property, attribute, or characteristic concepts (e.g., LENGTH or GAS-POWERED) or more abstract safety, troubleshooting, or hazard concepts (e.g., EYE-PROTECTION, STRIPPED-SCREW, or RISK-OF-SHOCK). In some embodiments, the taxonomy of concepts 104 also defines a plurality of synonyms for each concept, which are used to ground questions from users that are asked using alternative terminology.

Figure 3:
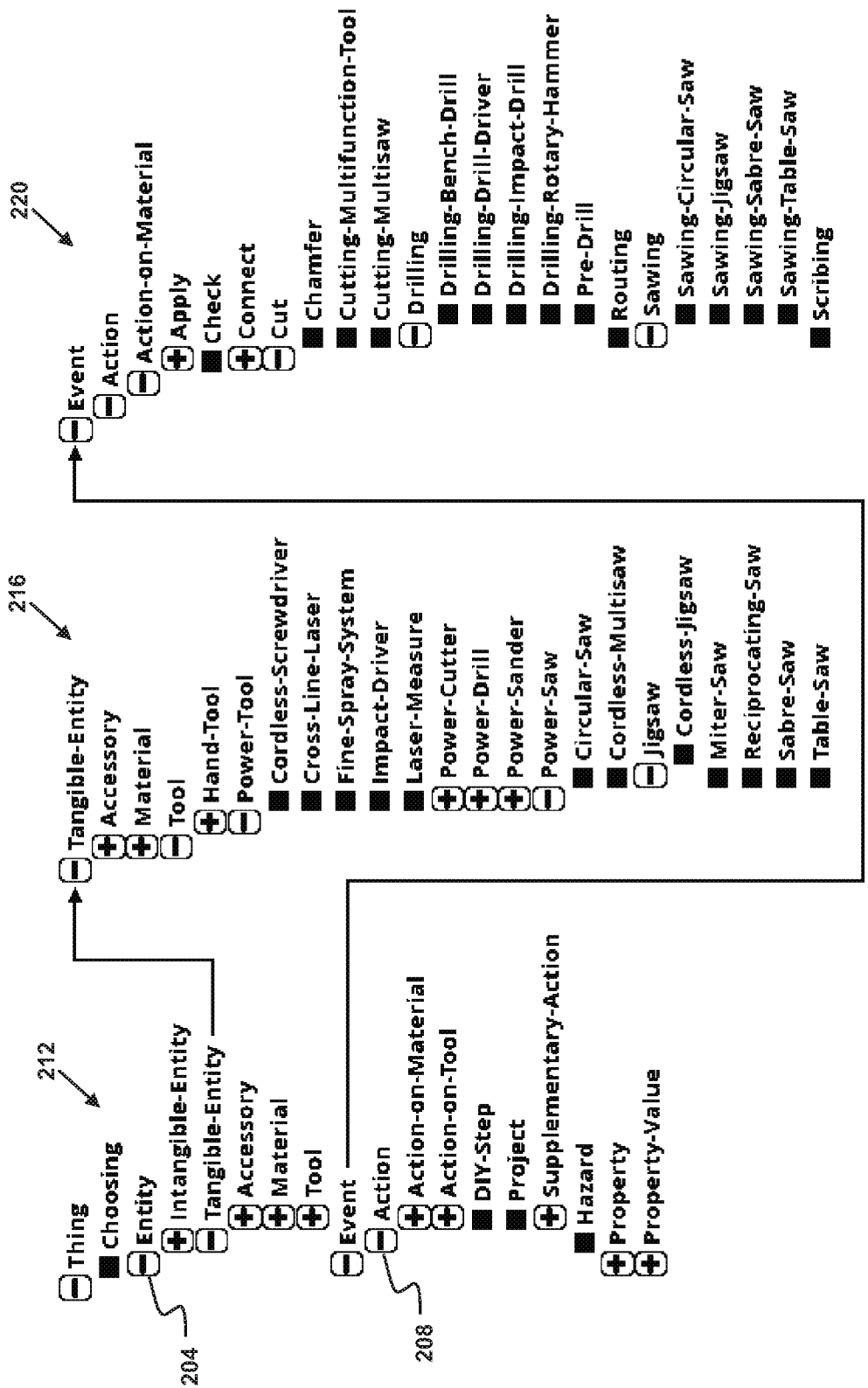
FIG. 3 shows an exemplary portion of a taxonomy of concepts of a DIY knowledge base.

FIG. 3 shows an exemplary portion 200 of the taxonomy of concepts 104. The exemplary portion 200 includes hierarchically defined entity concepts 204 and action concepts 208. The leftmost portion 212 of the FIG. 3 shows a high level summary of the taxonomy in which all concepts fall within the "Thing" hierarchy label. The middle portion 216 of FIG. 3 shows an expanded view of the "Tangible-Entity" hierarchy label and the concepts included therein. The rightmost portion 220 of FIG. 3 shows an expanded view of the "Event" hierarchy label and the concepts included therein.

In some embodiments, the taxonomy of concepts 104 is generated, at least in part, by automatically extracting terms and phrases from a corpus of DIY project related texts using hand-crafted patterns (e.g., extracting terms and phrases for an entity concept and an action concept using the pattern 'use <entity> to <action>'). Such patterns are highly accurate but may have low recall. Accordingly, in some embodiments, further concepts are extracted by applying distributional similarity to the ones already extracted. The extracted concepts are manually reviewed by experts in the DIY domain to create the concepts and their taxonomy. In some embodiments, additional concepts may be added manually by the experts or the entirety of the taxonomy of concepts 104 can be manually generated and curated by the experts.

The domain knowledge representations 112 comprise a plurality of knowledge representations corresponding to the various concepts in the DIY domain and store generally applicable information about the respective concept that is not specific to any particular DIY project. Particularly, in some embodiments, the domain knowledge representations 112 include at least one respective domain knowledge representation for each of the concepts defined in the taxonomy of concepts 104. In some embodiments, the domain knowledge representations 112 include two distinct types of domain knowledge representations.

The first type of domain knowledge representation is specifically designed for answering certain types of domain questions which ask for descriptive explanations of a concept and includes definitions, explanations, diagrams, attributes, aspects, attributes, features and the like relating a particular concept defined in the taxonomy 104. In this way, the first type of domain knowledge representation is only partially structured because they contain unstructured texts or illustrative pictures as values for some entities.

Figure 4:
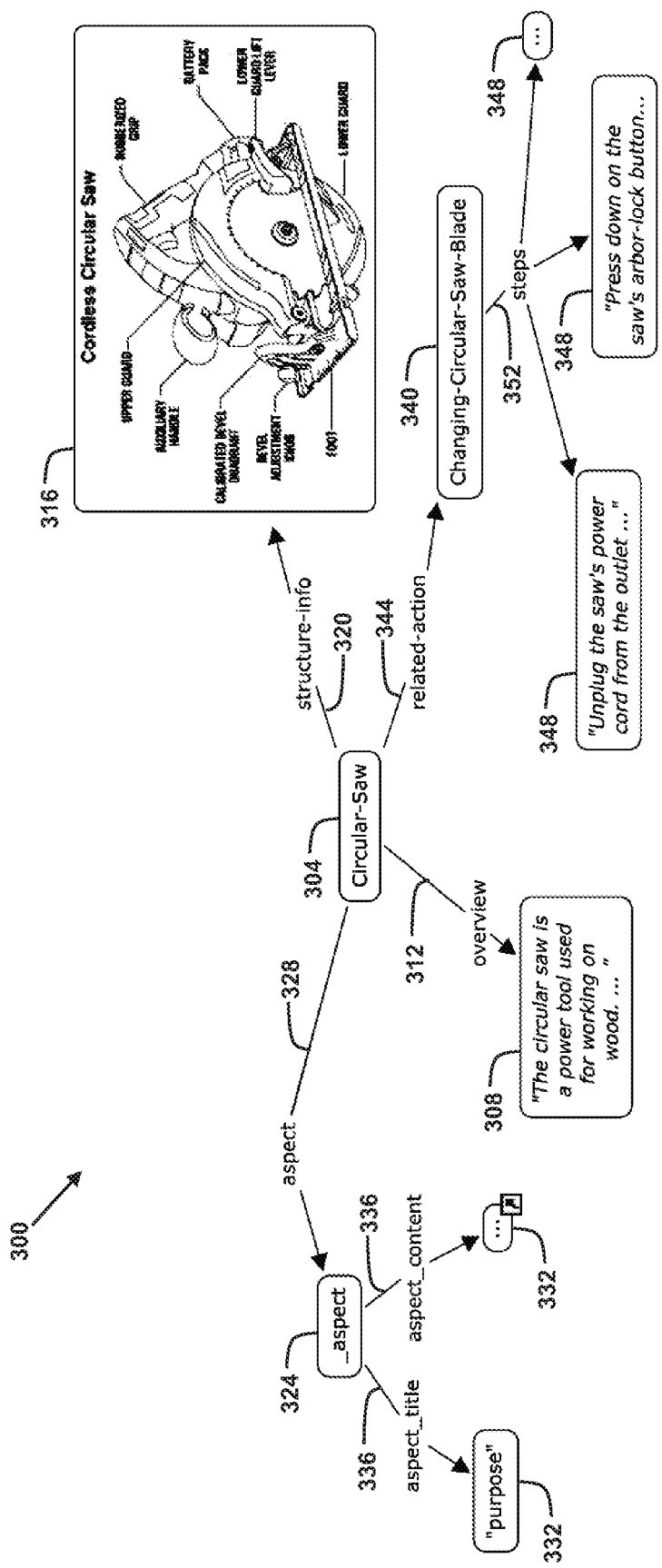
FIG. 4 shows an exemplary domain knowledge representation of a first type for the 'Circular Saw' concept.

FIG. 4 shows an exemplary domain knowledge representation 300 of the first type for the "Circular-Saw" concept. The domain knowledge representation 300 includes a domain entity 304 (e.g., "Circular-Saw") which directly corresponds to one of the concepts defined in the taxonomy 104. The domain knowledge representation 300 defines a plurality of additional secondary entities (shown as rounded rectangles) which are related to the domain entity 304 by various defined relationships (shown as arrows). For example, in the illustrated embodiment, the domain knowledge representation 300 includes an overview entity 308 having unstructured text as its value (e.g., "The circular saw is a power tool used for working on wood . . . ") which is related to the domain entity 304 by an overview relationship 312. Similarly, the domain knowledge representation 300 includes a structure-info entity 316 having an image as its value (e.g., a labeled schematic diagram) which is related to the domain entity 304 by a structure-info relationship 320. The domain knowledge representation 300 may include any number of additional aspect entities 324 which include information regarding other aspects, attributes, features of the concept, which are related to the domain entity 304 by respective aspect/attribute relationships 328. In some instances, the domain knowledge representation 300 defines further sub-entities 332 (e.g., an aspect_purpose entity or an aspect_content entity) that define further information about the aspect of the concept and are related to a secondary entity (e.g., the aspect entity 324) by further relationships 336 (e.g., an aspect_purpose relationship or an aspect_content relationship).

In some embodiments, a domain knowledge representation may define relationships with other knowledge representations, including other domain knowledge representations. In the example of FIG. 4, the domain knowledge representation 300 defines a related-action entity 340 (e.g., "Changing-Circular-Saw-Blade") which is related to the domain entity 304 by a related-action relationship 344. The related-action entity 340 may correspond to a separate domain knowledge representation for the Changing-Circular-Saw-Blade action concept or may be defined only within the domain knowledge representation 300. In the illustrated embodiment, step entities 348 (e.g., "Unplug the saw's power cord from the outlet . . . " and "Press down on the saw's arbor-lock button . . . ") are defined and are related to the related-action entity 340 by step relationships 352 (indicating that the respective steps are steps of the changing a circular saw blade).

The second type of domain knowledge representation is a fully structured representation which is designed to supplement related project knowledge representations and to support reasoning by the DIY question answering backend 25. In one embodiment, the second type of domain knowledge representation describes a particular action concept defined in the taxonomy 104 in a detailed manner that is generally applicable to any DIY project in which the particular action concept is used. Furthermore, the second type of domain knowledge representation defines implicit constraints that are not typically specified explicitly in the steps for a particular DIY project.

Figure 5:
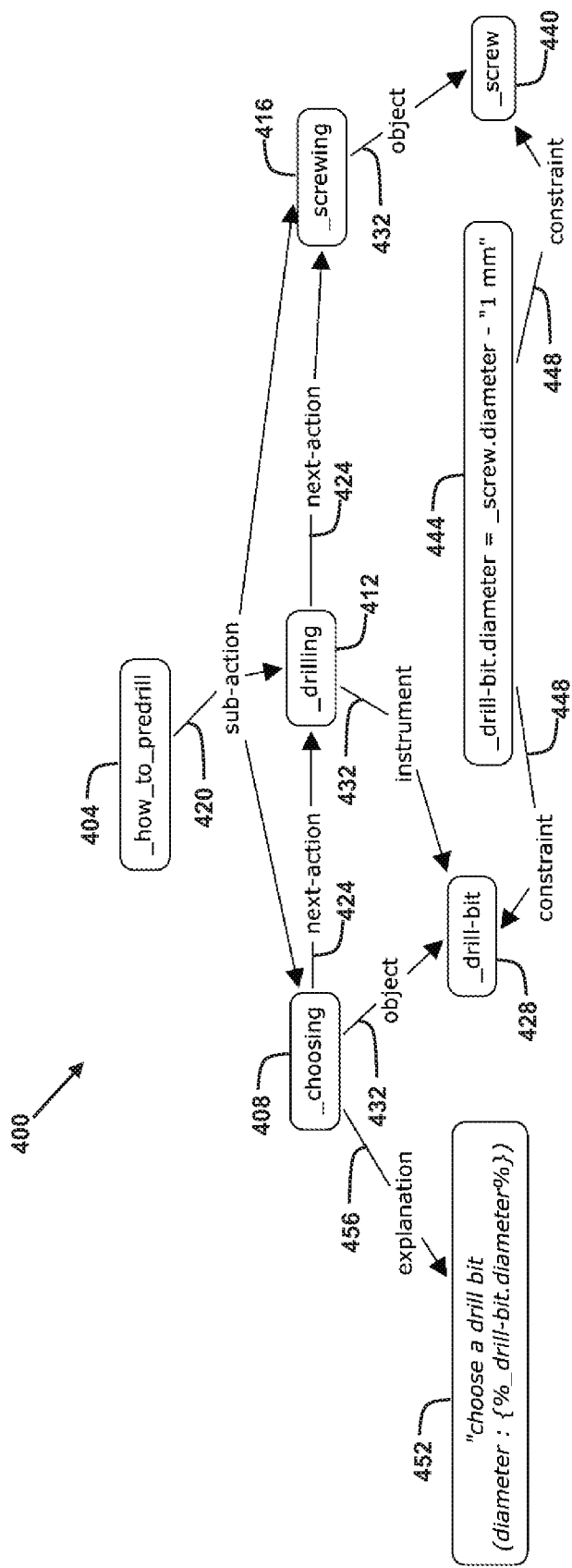
FIG. 5 shows an exemplary domain knowledge representation of a second type for the 'How to Predrill' concept.

FIG. 5 shows an exemplary domain knowledge representation 400 of the second type for the "_how_to_predrill" concept. The domain knowledge representation 400 includes a domain entity 404 (e.g., "_how_to_predrill") which directly corresponds to one the action concepts defined in the taxonomy 104. The domain knowledge representation 400 defines a first step entity 408 (e.g., "_choosing"), a second step entity 412 (e.g., "_drilling"), and a third step entity 416 (e.g., "_screwing") which are related to the domain entity 404 by sub-action relationships 420 (indicating that choosing, drilling, and screwing are sub-actions of the predrilling action concept). The domain knowledge representation 400 defines that the second step entity 412 is related to the first step entity 408 by a next-action relationship 424, indicating that the drilling is the next action after the choosing. The domain knowledge representation 400 defines that the third step entity 416 is related to the second step entity 412 by a next-action relationship 424, indicating that the screwing is the next action after the drilling. The domain knowledge representation 400 defines a first object entity 428 (e.g., "_drill-bit"), which is related to the first step entity 408 by an object relationship 432, indicating that the drill bit is the object of the drilling. Similarly, the domain knowledge representation 400 defines that the first object entity 428 is further related to the second step entity 412 by an instrument relationship 436, indicating that the drill bit is the instrument of the drilling. Additionally, the domain knowledge representation 400 defines a second object entity 440 (e.g., "_screw"), which is related to the third step entity 408 by an object relationship 432, indicating that the screw is the object of the screwing.

In some embodiments, a domain knowledge representation may include a constraint entity that defines a constraint between two object entities or two other entities. For example, in the example of FIG. 5, the domain knowledge representation 400 defines a constraint entity 444 (e.g., "_drill-bit.diameter=_screw.diameter—'1 mm'") which is related to the first object entity 428 and the second object entity 440 by constraint relationships 448. The constraint entity 444 in conjunction with constraint relationships 448 define a constraint between a parameter of the first object entity 428 and a parameter of the second object entity 440 (e.g., the diameter of the drill bit must be 1 mm smaller than the diameter of the screw). In at least some embodiments, one or more parameters of the constraint depend on the particular DIY project being completed, and are thus represented by variables in the domain representation. In the illustrated example, the diameter of the drill bit to be chosen and drilled with depends on a diameter of the screw to be screwed. The diameter of the screw is dependent on the particular DIY project being completed, and thus is represented as a variable.

In some embodiments, a domain knowledge representation may include an explanation template that is completed depending on project variables. For example, in the example of FIG. 5, the domain knowledge representation 400 defines an explanation entity 452 that is related to the first step entity 408 by an explanation relationship 456. The value of the explanation template entity 452 includes a text explanation which refers to a variable (e.g., "drill-bit.diameter") which is constrained by a project parameter (e.g., "_screw.diameter"), such that the explanation is project specific (e.g., "choose a drill bit (diameter: {% drill-bit.diameter %})").

Returning to FIG. 2, the project knowledge representations 108 comprise a plurality of knowledge representations corresponding to the various DIY projects. Unlike the domain knowledge representations 112, the project knowledge representations 108 store information that is specific to particular DIY projects. Particularly, using the concepts defined in the taxonomy 104, each project knowledge representation defines the steps, tools, and materials required to complete a particular DIY project.

Figure 6:
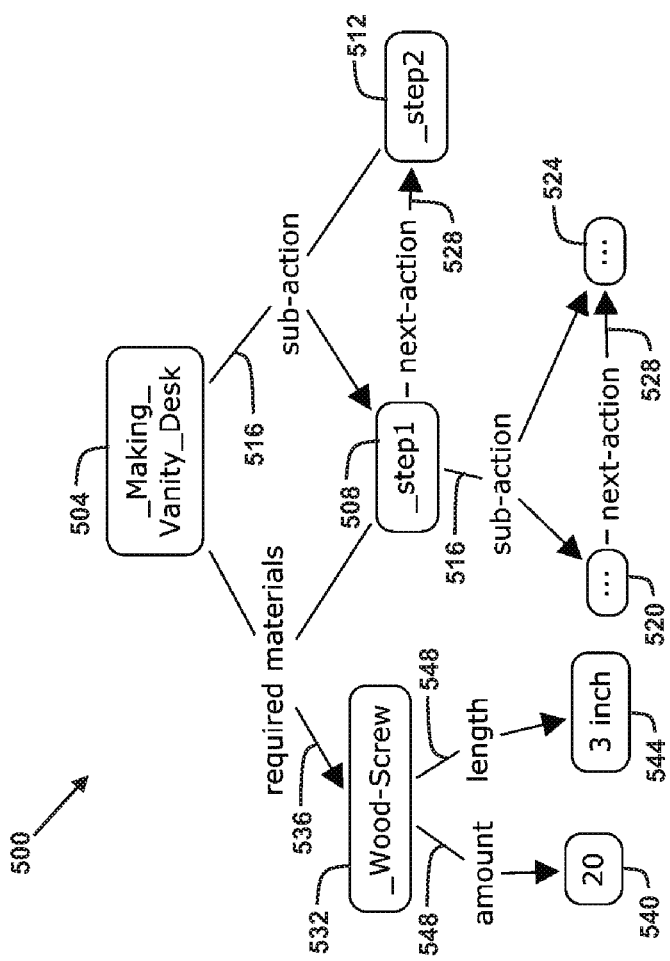
FIG. 6 shows a portion of an exemplary project knowledge representation for the 'Making a Vanity Desk' DIY project.
Figure 7:
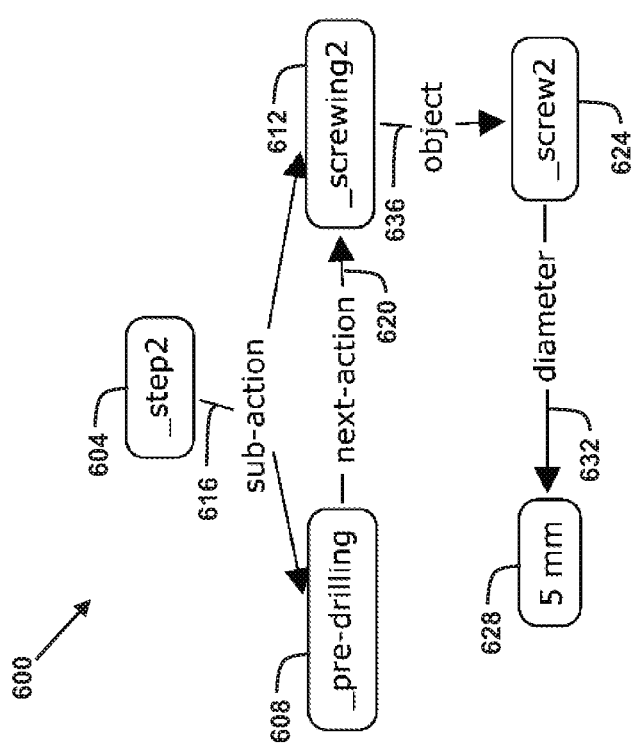
FIG. 7 shows a portion of a further exemplary project knowledge representation that defines sub steps of a particular step of a DIY project.

In some embodiments, each project knowledge representation defines a hierarchical structure of actions and/or steps required to complete the respective DIY project. FIG. 6 shows a portion of an exemplary project knowledge representation 500. The project knowledge representation 500 defines a DIY project entity 504 (e.g., "_Making_Vanity_Desk") that decomposes into a first step entity 508 (e.g., "_step1") and a second step entity 508 (e.g., "_step2"), as indicated by sub-action relationships 516. The first step entity 508 further decomposes into a first sub-step entity 520 and a second sub-step entity 524, as indicated by further sub-action relationships 516. The project knowledge representation 500 defines that the second step entity 508 is the next action after the first step entity 508 and that the second sub-step entity 524 is the next action after the first sub-step entity 520, as indicated by next-action relationships 528. Similarly, FIG. 7 shows a portion of a further exemplary project knowledge representation 600 that defines a step entity 604 (e.g., "_step2") that decomposes into a first sub-step entity 608 (e.g., "_pre-drilling") and a second sub-step entity 612 (e.g., "_screwing2"), as indicated by sub-action relationships 616. The second sub-step entity 612 is the next action after the first sub-step entity 608, as indicated by next-action relationships 620.

In some embodiments, each project knowledge representation defines the required materials and/or tools required to complete the respective DIY project, as well as the specification information of each required material and/or tool (if applicable). Particularly, in the example of FIG. 6, the project knowledge representation 500 defines that a material entity 532 (e.g., "_Wood-Screw") is a required material for the DIY project entity 504, as indicated by the required material relationship 536. The project knowledge representation 500 further defines an amount entity 540 (e.g., "20") and a length entity 544 (e.g., "3 inch") for the material entity 532, as indicated by the amount relationship 548 and length relationship 552, respectively. Similarly, in the example of FIG. 7, the project knowledge representation 600 defines a material entity 624 (e.g., "_screw2") and a diameter entity 628 (e.g., "5 mm") for the material entity 624, as indicated by the diameter relationship 632.

In some embodiments, a project knowledge representation not only defines the required materials and/or tools required to complete the respective DIY project, but defines the required materials and/or tools required to complete individual steps or subs-steps. Particularly, in the example of FIG. 6, the project knowledge representation 500 defines that the material entity 532 (e.g., "_Wood-Screw") is a required material for the first step entity 508, as indicated by the required material relationship 536. Similarly, in the example of FIG. 7, the project knowledge representation 600 defines that the material entity 624 (e.g., "_screw2") is the object of the second sub-step entity 612 (e.g., "_screwing2"), as indicated by the object relationship 636.

In some embodiments, the project knowledge representations 108 are constructed in a semi-automated manner from a DIY project instructional document. First, the required first entities and their required specification are automatically extracted from a preparation list in the DIY project instructional document. In one embodiment, the extraction is conducted by applying concept-to-word mappings defined in the taxonomy 104 using regular expressions to parse the specification information. The hierarchical action structure is extracted from the text description of each step. Particularly, in one embodiment, the actions are first identified using the concept-to-word mappings defined in the taxonomy 104 and linguistic cues are used to identify the temporal relations. For example, "then" and "after that" are identified as next-action relation between the following and the preceding action. In some embodiments, the information stored in the respective project knowledge representations is manually extended by adding additional information unspecified in the original DIY project instructional document.

Returning to FIG. 2, the product knowledge representations 116 comprise a plurality of knowledge representations corresponding to individual commercial available products that might be used to complete a particular DIY project. Finding the right tools and materials is a crucial step in the DIY projects. It is however time-consuming because it requires the DIYers to manually identify the required specifications and search for the matching products. Each product knowledge representation stores information regarding a particular product, such as a particular tool, accessory, material, or the like, which are used to recommend products that are suitable for a particular DIY project.

Figure 8:
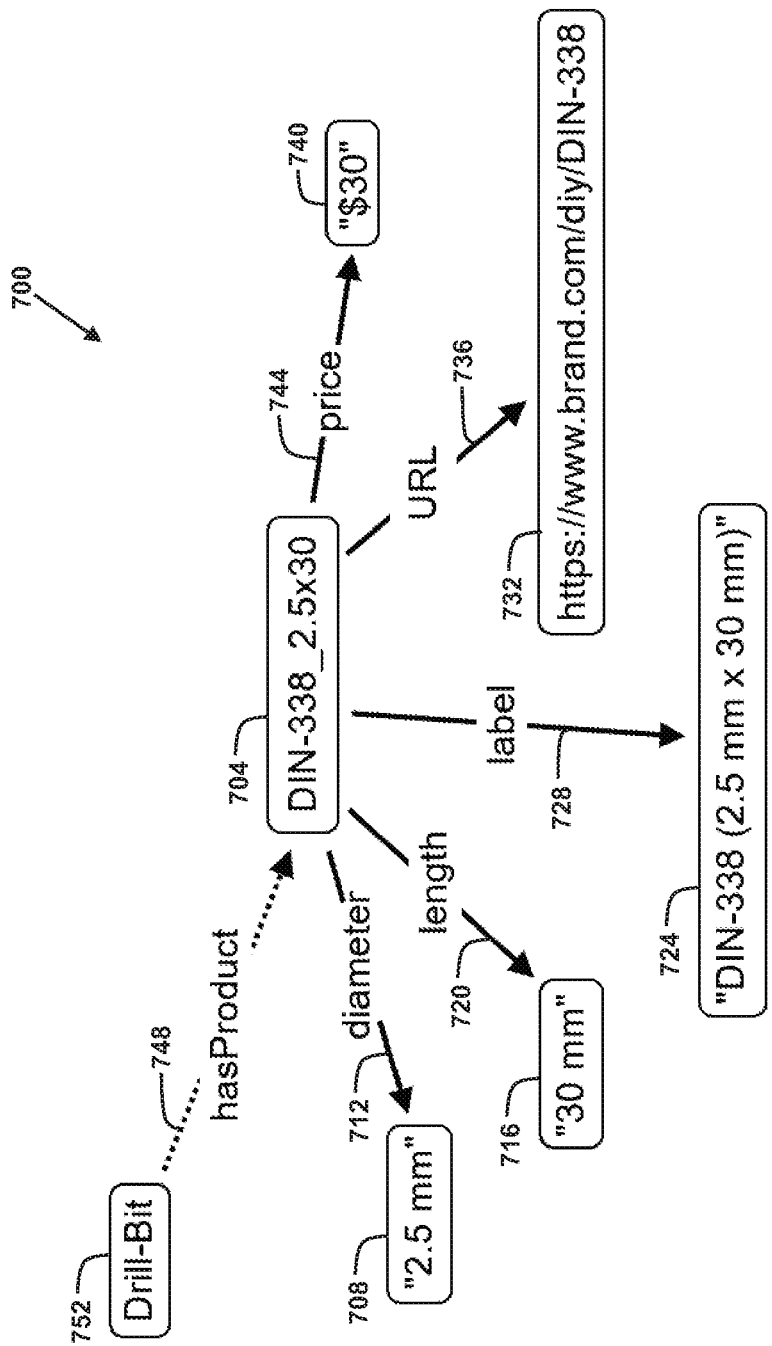
FIG. 8 shows an exemplary product knowledge representation for the 'DIN-338 (2.5 mm×30 mm)' product.

FIG. 8 shows an exemplary product knowledge representation 700 defining a product entity 704 (e.g., "DIN-338_2.5×30"). The product knowledge representation 700 defines a diameter entity 708 (e.g., "2.5 mm") for the product entity 704, as indicated by the diameter relationship 712. The product knowledge representation 700 defines a length entity 716 (e.g., "30 mm") for the product entity 704, as indicated by the length relationship 720. The product knowledge representation 700 defines a label entity 724 (e.g., "DIN-338 (2.5 mm×30 mm)") for the product entity 704, as indicated by the label relationship 728. The product knowledge representation 700 defines a URL entity 732 (e.g., "https://www.brand.com/diy/DIN-338") for the product entity 704, as indicated by the URL relationship 736. Finally, the product knowledge representation 700 defines a price entity 740 (e.g., "$30") for the product entity 704, as indicated by the price relationship 744.

In some embodiments, a product knowledge representation includes an external reference to a related domain knowledge representation or a related concept in the taxonomy 104. Particularly, in the example of FIG. 8, the product knowledge representation 700 defines a hasProduct relationship 748 between the product entity 704 (e.g., "DIN-338_2.5×30") and a domain entity and/or taxonomy concept 752 (e.g., "Drill-bit"), indicating that the "DIN-338 (2.5 mm×30 mm)" is a "Drill-Bit" or, conversely, that the "Drill-Bit" concept/domain has the product "DIN-338 (2.5 mm×30 mm)."

Returning to FIG. 2, the user/context knowledge representation(s) 120 store information such as the contextual information regarding a current DIY project being completed by the user, previous DIY projects completed by the user, an age of the user, a skill level of the user, a list of tools that the user has access to. The information stored in the user/context knowledge representation(s) 120 can be used to personalize answers to be specific to the current DIY project context and/or specific to the user and to connect to other DIY-related services (e.g., shopping for required power tools, renting, repairing, etc.).

Question Answering Process

The question answering system 10 and the architecture 100 thereof combines multiple AI technologies including natural language processing (NLP), knowledge representation, and reasoning to provide professional DIY assistance to users through the whole life cycle of a DIY project as a one-stop solution. For example, when a user is in the planning stages of a DIY project, he or she can ask the question answering system 10 questions such as: "What tools are needed?," "How long does the project take?," and "Can I use a jigsaw instead of a circular saw?" Similarly, when the user is in the process of completing a DIY project, he or she can ask questions such as "How can I use a jigsaw?" and "Where should I drill the hole?" The question answering system 10 is able to directly answer a user's questions at all stages of a DIY project. In addition, by taking into account the user and context information, e.g., the DIY experience of the user, the tools already acquired by the user, the question answering system 10 provides personalized and context-aware QA service. In this way, the question answering system 10 helps DIYers to prepare for and complete DIY projects more efficiently and provides assistance based on personal needs.

Various methods, processes, or steps of the DIY question answering backend 25 are shown in FIG. 2 and described in further detail below. In the description of the methods, processes, or steps, statements that the DIY question answering backend 25 or the DIY assistant application 37 is performing some task or function refers to a controller or general purpose processor executing programmed instructions stored in non-transitory computer readable storage media operatively connected to the controller or processor to manipulate data or to operate one or more components in the question answering system 10 to perform the task or function. Particularly, the processor 21 of the server 20 and/or the processor 31 of client device 30 above may be such a controller or processor. Alternatively, the processor may be implemented with more than one processor and associated circuitry and components, each of which is configured to form one or more tasks or functions described herein. Additionally, the steps of the methods or processes may be performed in any feasible chronological order, regardless of the order shown in the figures or the order in which the steps are described.

Particularly, in the illustrated embodiment, the processor 21 of the server 20 is configured to execute program instructions of the DIY question answering backend 25 to implement four distinct processes. In summary, a natural language question 124 is received and interpreted in a question understanding process 128 to generate a structured question 132. Next, the structured question 132 is grounded in a grounding process 136 to generate a grounded question 140. Next, in a reasoning process 144, the DIY knowledge base 26 is used to generate a structured answer 148 based on the grounded question 140. Finally, in an answer generation process 152, the structured answer 148 is converted in to a multi-modal natural answer 156.

With continued reference to FIG. 2, the question answering process begins with receiving the natural language question 124 from the user. Particularly, with respect to the embodiments described in detail herein, the processor 31 of the client device 30 is configured to execute program instructions of the DIY assistant application 37 to receive the natural language question 124 from the user. In one embodiment, the processor 31 operates the display screen 35 to display a graphical user interface on the display screen 35, which includes a question prompt via which the user can type the natural language question 124 in the form of text using a keyboard or the like. The processor 31 is configured to receive the text corresponding to the natural language question 124 via a physical or virtual keyboard of the client device 30. Alternatively, the user may speak the natural language question 124 into the microphone 36 and the processor 31 is configured to receive audio corresponding to the natural language question 124. In one embodiment, the processor 31 is configured to transcribe the received audio into a text form. Finally, the processor 31 is configured to operate the transceivers 33 to transmit the natural language question 124, either in text form or audio form, to the server 20 for processing. The processor 21 of the server 20 is configured to operate the network communication module 24 to receive the natural language question 124 from the client device 30.

With continued reference to FIG. 2, once the natural language question 124 has been received at the server 20, in the question understanding process 128, the structured question 132 is generated based on the natural language question 124. Particularly, the processor 21 of the server 20 is configured to execute program instructions of the DIY question answering backend 25 to generate the structured question 132 based on the natural language question 124. The generation of the structured question 132 is conducted in two steps. First, the processor 21 is configured identify the type of question being asked (which may be referred to herein as the "intent" of the question). Second, the processor 21 is configured to extract semantic information from the natural language question 124 for one or more predefined slots corresponding to the identified type of question.

FIG. 9 shows a table 800 describing a set of exemplary question types. At the top level, the question types are classified into two categories: project questions and domain questions. The project question types encompass questions specifically directed to a particular DIY project and include, for example, a required entities/properties question type (e.g., "What power tools do I need in the project?" or "What is the length of the drill bit needed in the project?"), an alternative entities question type (e.g., "Can I use a circular saw instead of a jigsaw in step 2?"), a time/difficulty/cost question type (e.g., "How long does the project take?," "How difficult is the project?," or "How much are the power tools needed in the project?"), an explanation of actions question type (e.g., "Can you explain the sawing step in more detail?"), a specific location of actions question type (e.g., "Where should it be screwed?"), and an alternative actions question type (e.g., "Are there other options instead of pre-drilling?"). In contrast, the domain question types encompass questions about general domain knowledge, which are not directed to a particular DIY project, and include, for example, a definition of tool/accessory/material question type (e.g., "What is a jigsaw?," "What is a drill bit?," or "What is a wood screw?"), related action question type (e.g., "What can I do with a jigsaw?"), a tips question type (e.g., "Is there any safety tip for using a jigsaw?"), a structural info question type (e.g., "What does a jigsaw look like?"), and a comparison question type (e.g., "How does a jigsaw differ from a circular saw?").

The processor 21 is configured to select and/or identify a particular question type from a predetermined set of possible question types that best fits the intent of natural language questions 124. Each question type in the predetermined set of possible question types includes one or more predefined slots (e.g., tool name, action name, property type). The processor 21 is further configured to extract semantic information from the natural language question 124 to place in each slot for the identified question type. The processor 21 is configured to select and/or identify the correct question type and fill the predefined slot(s) with semantic information using pattern-based methods, statistical methods, or a combination thereof. In one embodiment, the processor 21 is configured to detect the question type and fill the slot(s) with semantic information by processing and parsing the natural language question 124 according to hand-crafted rules or patterns. In one embodiment, if the natural language question 124 does not match the hand-crafted rules or patterns, the processor 21 is configured to identify possible concepts or slots present in the natural language question 124 using a domain dictionary and word embedding based similarity calculation, and to apply a support vector machine with linguistic and slot features to classify the natural language question 124 as a particular question type from a predetermined set of possible question types. In some embodiments, deep learning approaches such as convolutional neural networks may be further utilized to classify the natural language question 124 as a particular question type from a predetermined set of possible question types and to fill the predefined slot(s) with semantic information.

As an example, consider the natural language question "How much are the power tools needed in the project?" In response to receiving this question, the processor 21 determines that the question type is the cost inquiry question type. The cost inquiry question type includes two predefined slots: an entity concept slot and an action/project name slot. The processor 21 extracts the phrase "power tools" from the natural language question to fill the entity concept slot and extracts the phrase "the project" from the natural language question to fill the action/project name slot. The structured form of the question is the combination of the identified question type and the filled slots. Thus, the natural language question "How much are the power tools needed in the project?" is converted into a structured question in the form of [(question_type: cost_inquiry); (entity_concept: "power tools"); (action/project_name: "the project")], where first item identifies the intent or question type and subsequent items identify the predefined slots and corresponding extracted semantic information.

As another example, consider the natural language question "Can you explain predrilling in more detail?" In response to receiving this question, the processor 21 determines that the question type is the explanation of actions question type. The explanation of actions question type includes one predefined slot: an action name slot. The processor 21 extracts the term "predrilling" from the natural language question to fill the action name slot. Thus, the natural language question "Can you explain pre-drilling in more detail?" is converted into a structured question in the form of [(question_type: action_explanation); (action_name: "predrilling")], where first item identifies the intent or question type and second item identifies the predefined slot and corresponding extracted semantic information.

With continued reference to FIG. 2, once the structured question 132 has been generated, the grounded question 140 is determined, in the grounding process 136, based on the structured question 132. As described above, the structured question 132 includes extracted semantic information from the natural language question 124 (e.g., the strings "power tools," "the project," and "predrilling") but the semantic information is still in the words of the user. In the grounding process 136, the semantic information is converted to the most relevant corresponding language used in the taxonomy of concepts 104 or elsewhere in the DIY knowledge base 26. In this way, the various possible phrases and terms that might be used by the user to describe a particular concept are simplified into the grounded lexicon of the DIY knowledge base 26.

The processor 21 of the server 20 is configured to execute program instructions of the DIY question answering backend 25 to generate the grounded question 132 by matching the extracted semantic information in each of the slots of the structured question 132 to the corresponding language used in the taxonomy of concepts 104 or elsewhere in the DIY knowledge base 26. In one embodiment, the processor 21 is configured to perform the matching by resolving the semantic information to the concepts in the taxonomy 104 using one or more heuristic rules. In one embodiment, the processor 21 is configured to perform the matching using known synonyms for each concept stored in the taxonomy 104.

As an example, the example structured question in the form of [(question_type: cost_inquiry); (entity_concept: "power tools"); (action/project_name: "the project")] might be converted into a grounded question in the form of [(question_type: cost_inquiry); (entity_concept: required_tool); (action/project_name: current_project)], where required_tool and current_project are concepts, entities, and/or relationships defined in DIY knowledge base 26. Similarly, the example structured question in the form of [(question_type: action_explanation); (action_name: "pre-drilling")] might be converted into a grounded question in the form of [(question_type: action_explanation); (action_ name: Pre-drilling)], where _Pre-drilling is a concept defined in DIY knowledge base 26.

With continued reference to FIG. 2, once the grounded question 140 is determined, the structured answer 148 is derived in the reasoning process 144. Particularly, for each predetermined question type in the predetermined set of possible question types, the processor 21 is configured to execute a reasoning process specifically designed for the question type. The processor 21 is configured to retrieve data from the DIY knowledge base 26 using a query template having a form that depends on the determined question type of the natural language question 124. For example, in response to each particular question type identified in the table 800 of FIG. 9, the processor 21 is configured to retrieve data from the DIY knowledge base 26 using a query template that is specifically formulated for the particular question type. In many instances, the query template that is specifically formulated for each particular question type includes empty variables and/or blanks corresponding to some or all of the predefined slots of the particular question type that are filled based on the grounded semantic information identified in the grounded question 140. In at least one embodiment, the queries used to retrieve data from the DIY knowledge base 26 are SPARQL query, but may take other forms. The retrieved data from the DIY knowledge base 26 may take the form of values, numbers, text strings, images, videos, audio recordings, documents, or any combination thereof. Finally, the processor 21 is configured to generate the structured answer 148 based on the retrieved data from the DIY knowledge base 26 using a predefined template corresponding to the particular question type.

In some embodiments, for certain question types, the query template used to retrieve data from the DIY knowledge base 26 is configured to retrieve data from only one knowledge representation. For example, consider the natural language question "What is a jigsaw?" After the question understanding process 128 and the grounding process 136, the processor 21 generates the grounded question in the form of [(question_type: definition_inquiry); (entity_concept: circular-saw)], where definition_inquiry is the question type and _circular-saw is a grounded concept in the entity_concept slot. Given this type of question, the processor 21 is configured to use a predefined query template that retrieves the value of an overview entity of the domain knowledge representation for the grounded concept in the entity_concept slot (e.g., the overview entity 308 of the domain knowledge representation 300 shown in FIG. 4). The processor 21 is configured to generate a structured answer in the form of [(answer_type: definition_inquiry); (overview: "The circular saw is a power tool used for working on wood . . . ")].

Similarly, given the natural language question "What does a circular saw look like?," a query template is used that that retrieves the value of an structure-info entity of the domain knowledge representation for the grounded concept in the entity_concept slot (e.g., the value of the structure-info entity 316 of the domain knowledge representation 300 shown in FIG. 4). The processor 21 is configured to generate a structure answer in the form of [(answer_type: definition_ inquiry); (structure-info: circular-saw.jpg)], where circular-saw.jpg was retrieved from the DIY knowledge base 26. Similar query templates are used for other domain question types, such as the related action question type and the tips question type, discussed above. In each case, the processor 21 is configured to generate the structure answer 148 using data retrieved from the DIY knowledge base 26 via a corresponding query template.

In some embodiments, for certain question types, the query template used to retrieve data from the DIY knowledge base 26 is configured to retrieve data from multiple different knowledge representations in the DIY knowledge base 26, and the processor 21 is configured to combine, process, and/or compare the retrieved data to generate new data that is included in the structured answer. For example, consider the natural language question "How does a jigsaw differ from a circular saw?," which yields a grounded question in the form of [(question_type: comparison_inquiry); (entity_concept1: _jigsaw); (entity_concept2: _circular-saw)]. The processor 21 is configured to retrieve data using a query template configured to retrieve aspects, supported actions, and other properties of a jigsaw from a jigsaw domain knowledge representation, and to retrieve aspects, supported actions, and other properties of a circular saw from a circular saw domain knowledge representation. Next the processor 21 is configured to compare the retrieve data for the jigsaw with the retrieved data for the circular saw and generate new data relating to only those aspects, supported actions, and other properties that are different between a jigsaw and circular saw. The processor 21 generates a structured answer using the generated new data, such as a structured answer in the form of [(answer_type: comparison_inquiry); (difference1: curved_cut)], where curved_cut identifies to the supported action of a jigsaw to cut a curved cut, which is not possible with a circular saw.

In some embodiments, for certain question types, the query template used to retrieve data from the DIY knowledge base 26 is configured to retrieve data in multiple steps. Particularly, some query templates include one or more empty variables and/or blanks that do not correspond to any of the predefined slots of the particular question type, and the processor 21 is configured to query the DIY knowledge base 26 to retrieved data that is used to fill one or more remaining empty variables and/or blanks in query template. For example, consider the natural language question "What power tools do I need in the project?," which yields a grounded question in the form of [(question_type: required_entities_inquiry); (action/project_name: current_project)]. The processor 21 is configured to, using the query template, retrieve a project ID for the project currently being worked on from the user/context knowledge representation(s) 120. Next, the processor 21 is configured to, using the retrieved project ID, retrieve data indicating the required tools from the project knowledge representation corresponding to the project currently being worked on. In this way, executing the query against the DIY knowledge base 26 involves a multi-step process. In some embodiments, the querying process for all of the project question identified in the table 800 of FIG. 9 begins with a step of retrieving the project ID from the user/context knowledge representation(s) 120.

For some question types, the processor 21 is configured to further retrieve information about the required tools, accessories and materials from the corresponding domain knowledge representations. Particularly, as another example, consider the natural language question "How much are the power tools needed in the project?," which yields the grounded question in the form of [(question_type: cost_inquiry); (entity_concept: required_tool); (action/project_name: current_project)], as discussed above. The processor 21 is configured to, for example, convert the grounded question into a SPARQL query using the following template:

SELECT ?entity, ?entity_price
WHERE {

-continued

<project_id> <entity_concept> ?entity .
?entity rdf:type ?entity_type .
?entity_type rdfs:subClassOf* <concept> .
?entity_type price ?entity_price . } where <project id>, <entity_concept>, and <concept> are variables to be replaced by concrete values. Particularly, the <entity_concept> is a variable for what type of entities for which the user wants to cost of (e.g., required_tool, required_material, or required_entity). The <project_id> is a variable indicated the particular project for which the user what the cost for. The <concept> is a variable indicating the type of entities for which prices are to be retrieved.

The processor 21 is configured to use the grounded slot value required_tool in place of the <entity_concept> variable, which configures the query to only retrieve information regarding required tools, but not require materials or other entities. The processor 21 is configured to retrieve a project ID for the project currently being worked on from the user/context knowledge representation(s) 120 and use the retrieved project ID in place of the variable <project id>. Next, the processor 21 is configured to retrieve data indicating the required tools from the project knowledge representation corresponding to the retrieved project ID. Next, the processor 21 retrieves possible sub-classes of the required tools from the domain knowledge representations corresponding to the required tools. Finally, the processor 21 retrieves products options and prices thereof from the product knowledge representations corresponding to each of the required tools retrieved from the project knowledge representation.

After the necessary data has been retrieved from the DIY knowledge base 26, the processor 21 is configured to sum up the individual prices for the required tools to generate new data that is included in the structured answer. For our example question, the processor produces the following output:

{"answer" : (200,500),
"auxiliary" : {jigsaw : (30,150), cordless driver : (50,200), ... }}.

Based on the calculated output, a structured answer is generated in the form of [(answer_type: cost_inquiry); (entity_concept: required_tool); (answer: (200,500)); (auxiliary_answer: {jigsaw: (30,150), cordless driver: (50,200), . . . })]. The output represents the total price, which is estimated to be $200~$500, along with the individual prices of each power tool. In some embodiments, the processor 21 is configured to further include names of recommended products in the answer.

It will be appreciated that, to generate the structured answer to the natural language question "How much are the power tools needed in the project?," the processor 21 queried data from the project knowledge representations 108, the domain knowledge representations 112, the product knowledge representations 116, and the user/context knowledge representation(s) 120. Furthermore, the processor 21 post-processed the retrieved data to arrive at the information included in the structured answer.

In some embodiments, for certain question types, the processor 21 is configured to use semantic matching to match, map, link, or otherwise correlate entities from different knowledge representations. Particularly, the processor 21 is configured to identify one or more relevant knowledge representations that are relevant to answering the question based on the grounded question 140. Using semantic matching, the processor 21 is configured to match, map, link, or otherwise correlate entities of a first relevant knowledge representation to a second relevant knowledge representation. In some embodiments, the processor 21 is configured to identify the project knowledge representation for the current project and identify one or more domain knowledge representations that based on the grounded question. Next, the processor 21 is configured to semantically match entities defined in the project knowledge representation with entities defined in the one or more domain knowledge representations.

Figure 10:
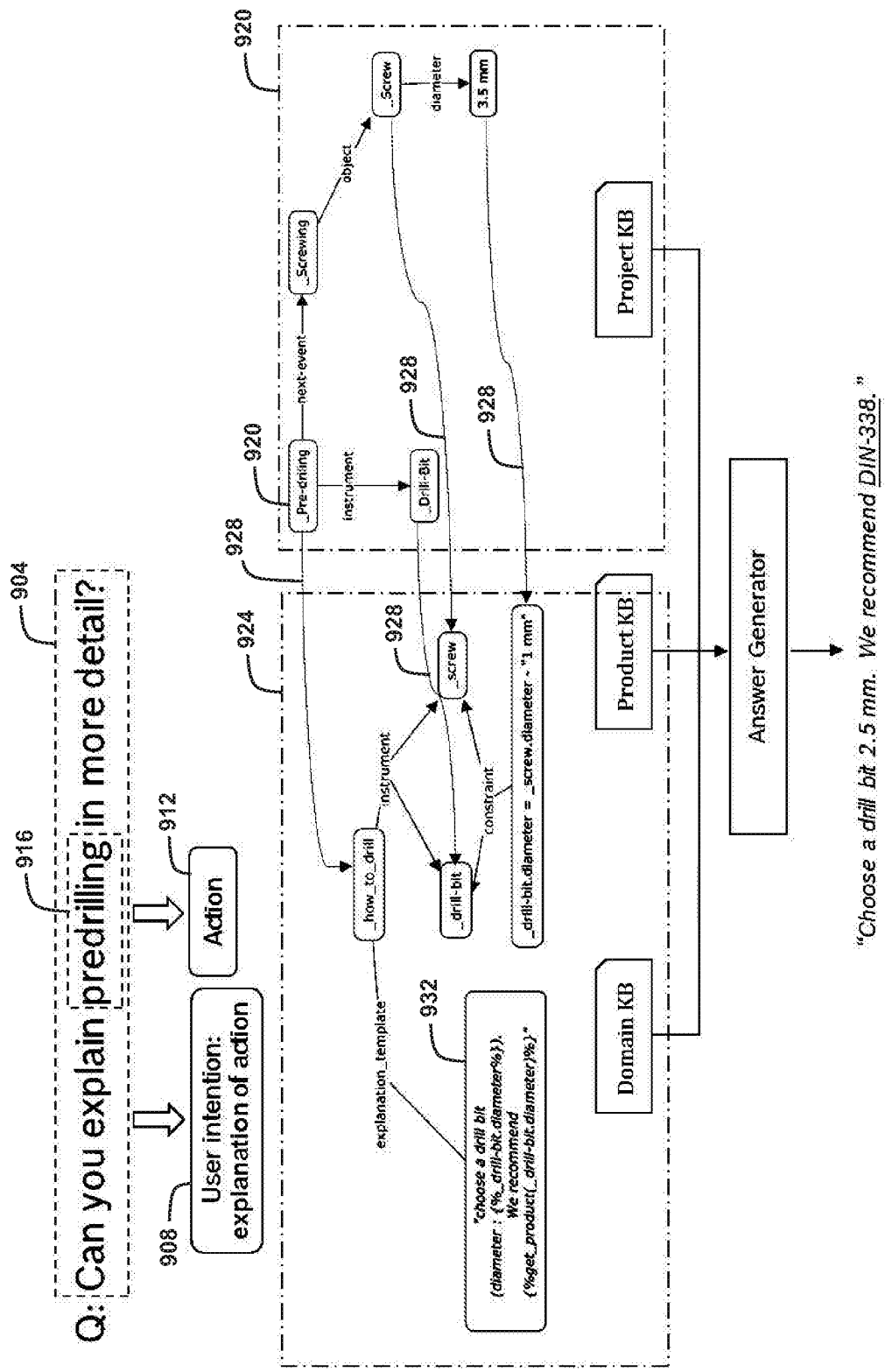
FIG. 10 shows an exemplary reasoning process used for an exemplary complex question type.

FIG. 10 shows an exemplary reasoning process used for an exemplary complex question type. Particularly, consider the natural language question 904 "Can you explain pre-drilling in more detail?" The processor 21 identifies that the question type 908 is the explanation of actions question type and fills the action name slot 912 with the text 916 "pre-drilling." Thus, the natural language question converted into a structured question in the form of [(question_type: action_explanation); (action_name: "predrilling")]. The processor 21 converts the structure question into the grounded question in the form of form of [(question_type: action_explanation); (action_name: _Pre-drilling)], where _Pre-drilling corresponds to a step entity in a project knowledge representation 920 corresponding to the current project (only a portion of which is shown in FIG. 10). The processor 21 identifies a domain knowledge representation 924 that is relevant to question and matches entities from the project knowledge representation 920 with entities of the domain knowledge representation 924, illustrated with arrows 928. Particularly, as shown, the _Pre-drilling step entity of the project knowledge representation 920 is semantically matched with the _how_to_drill domain entity of the domain knowledge representation 924. Similarly, the _Drill-Bit instrument entity of the project knowledge representation 920 is semantically matched with the drill-bit instrument entity of the domain knowledge representation 924. Additionally, the _Screw object entity of the project knowledge representation 920 is semantically matched with the _screw instrument entity of the domain knowledge representation 924.

In some embodiments, certain variables of a domain knowledge representation are explicitly defined in the project knowledge representation. Based on the semantic matching between the knowledge representations, the processor 21 is configured to set the variables equal to the explicitly defined values in the project knowledge representation. Next, the processor 21 is configured to resolve and/or calculate any constraints of the domain knowledge representation that include the variable. Particularly, in the example of FIG. 10, the domain knowledge representation 924 includes the variables _drill-bit.diameter and screw.diameter, as well as the constraint "_drill-bit.diameter=_screw.diameter—'1 mm'". The processor 21 semantically matches the _Screw.diameter entity (e.g., "3.5 mm") of the project knowledge representation 920 with the _constraint entity of the domain knowledge representation 924. Based on this matching, the processor 21 is configured set the _screw.diameter variable of the domain knowledge representation 924 equal to the value of the _Screw.diameter entity (e.g., "3.5 mm") of the project knowledge representation 920. Next, the processor 21 calculates the value of the _drill-bit.diameter variable (e.g., "3.5 mm"—"1 mm"="2.5 mm").

Finally, the processor 21 is configured to retrieve data from semantically matched knowledge representations using a query template for the question type. Particularly, in the example of FIG. 10, the processor 21 retrieves the value of the explanation template entity 932 (e.g., "choose a drill bit (diameter: {%_drill-bit.diameter %}). We recommend {% get_product(_drill-bit.diameter) %}"). The processor 21 is configured to set the _drill-bit.diameter variable equal to the calculated value (e.g., "2.5 mm") in the explanation template and retrieve the name of a drill bit from the product knowledge representations 116 that satisfies the criteria for diameter (e.g., "2.5 mm"). The processor 21 outputs a structured answer when is converted into the natural language answer "Choose a drill bit 2.5 mm. We recommend DIN-338."

Finally, for some complex question types, particularly for non-factoid questions such as questions about alternatives, the processor 21 is configured to utilize Answer Set Programming to infer a correct answer from multiple pieces of knowledge. Particularly, consider the natural language question "Can I use a circular saw instead of a jigsaw in step 2?". First, the processor 21 is configured to retrieve related actions that each tool can perform from the circular domain knowledge representations for each tool. Based on the domain knowledge representations, it is known that a circular saw can perform "cross cut" and "straight cut" actions and that a jigsaw can perform "cross cut," "straight cut," and "curve cut" actions. Next, the processor 21 is configured to retrieve information about step 2 of the current project from the corresponding project knowledge representation. If step 2 of the current project requires "curve cut", then the answer to the question should be "No" as a circular saw cannot perform "curve cut". Otherwise the answer is "Yes". In general, the answers to such types of questions are not fixed, but dynamic based on the project knowledge representation of the current DIY project, combined together with the relevant domain knowledge representations.

Returning to FIG. 2, in the answer generation process 152, the structured answer 148 is converted to a multi-modal natural answer 156. Particularly, the processor 21 is configured to, using a natural language template corresponding to the question type, represent the answer as on or more of natural language text string which may include contents in other formats (e.g. images, videos, audios). In some embodiments, the natural language template not only provides the answer to the question, but also provides an explanation with the answer. For example, consider the natural language question "How much are the power tools needed in the project?," which yields the structured answer [(answer_type: cost_inquiry); (entity_concept: required_tool); (answer: (200,500)); (auxiliary_answer: {jigsaw: (30,150), cordless driver: (50,200), . . . })], as discussed above. The processor 21 converts the structured answer to a natural language answer "The total price of the project is estimated to be $200~$500. Specifically, a jigsaw costs about $30~$150, a cordless driver costs about $50~$200, . . . ."

The processor 21 of the server 20 is configured to operate the network communication module 24 to transmit the multi-modal natural answer 156 to the client device 30. The processor 31 of the client device 30 is configured to operate the transceivers 33 to receive the multi-modal natural answer 156 from the server 20. The processor 31 is configured to operate at least one output device to perceptibly output the multi-modal natural answer 156 to the user. In one embodiment, the processor 31 operates the display screen 35 to display a graphical user interface on the display screen 35, which includes a the natural language text string of the multi-modal natural answer 156, as well as any images or videos included in the multi-modal natural answer 156. In one embodiment, the processor 31 operates a speaker of the client device 30 to read the natural language text string aloud and play an audio included in the multi-modal natural answer 156.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of answering natural language questions, the method comprising:
storing, in a memory of a server, a knowledge base having a plurality of knowledge representations, each knowledge representation describing a particular topic and defining at least two entities and at least one relationship between the at least two entities, a first subset of the plurality of knowledge representations describing objects including at least one of tools, accessories for the tools, and materials, a second subset of the plurality of knowledge representations each describing actions that can be performed with the at least one of the tools, the accessories for the tools, and the materials, a third subset of the plurality of knowledge representations describing step-by-step instructions for particular projects that can be completed with the at least one of the tools, the accessories for the tools, and the materials;
receiving, with a transceiver of the server, a natural language question from a client device;
determining, with a processor of the server, a question type from a predetermined set of possible question types to which the of the natural language question corresponds;
retrieving, with the processor, data from the knowledge base using a query template having a form that depends on the determined question type of the natural language question and a content of the natural language question;
generating, with the processor, an answer based on the retrieved data from the knowledge base; and
transmitting, with the transceiver, the answer to the client device, the answer being perceptibly output to a user by the client device.

2. The method of claim 1, the retrieving data from the knowledge base further comprising:
retrieving data from the knowledge base using a query template configured to retrieve data from at least two different knowledge representations in the plurality of knowledge representations.

3. The method of claim 2, the generating the answer further comprising:
generating the answer by combining the data retrieved from each of the at least two different knowledge representations.

4. The method of claim 2, further comprising:
determining, with the processor, additional data based on a comparison of data retrieved from a first of the at least two different knowledge representations with data retrieved from a second of the at least two different knowledge representations,
wherein the answer is generated using the additional data.

5. The method of claim 1, wherein:
the query template has at least one blank; and
the retrieving data from the knowledge base further comprises:
retrieving first data from a first knowledge representation in the plurality of knowledge representations;
filling the at least one blank in the query template using the first data; and
retrieving second data from a second knowledge representation in the plurality of knowledge representations using the query template with the filled at least one blank.

6. The method of claim 5, wherein:
the first data retrieved from the first knowledge representation is a project identifier for a project currently being worked on by a user who asked the natural language question; and
the second knowledge representation is from the third subset of the plurality of knowledge representations and describes step-by-step instructions for the project currently being worked on by the user.

7. The method of claim 1, wherein a fourth subset of the plurality of knowledge representations describe commercially available products corresponding to the at least one of the tools, the accessories for the tools, and the materials.

8. The method of claim 7, the retrieving data from the knowledge base further comprising:
retrieving first data from a first knowledge representation in the third subset of the plurality of knowledge representations that describes step-by-step instructions for a project currently being worked on by a user who asked the natural language question, the first data identifying objects that are required to complete the project currently being worked on by the user; and
retrieving, based on the first data, second data from at least one second knowledge representation in the fourth subset of the plurality of knowledge representations, the second data describing at least one commercially available product that corresponds to the objects that are required to complete the project currently being worked on by the user.

9. The method of claim 8, wherein:
the second data includes a cost of each object that is required to complete the project currently being worked on by the user;
the generating the answer includes calculating a total cost of all objects required to complete the project currently being worked on by the user; and
the answer includes the total cost.

10. The method of claim 8, wherein:
the first data defines specification requirements for the objects that are required to complete the project currently being worked on by the user;
the processing the second data includes identifying, based on the second data, at least one commercially available product that satisfies the specification requirements for the objects that are required to complete the project currently being worked on by the user; and
the generated answer includes a name of the identified commercially available product.

11. The method of claim 1, the retrieving data from the knowledge base further comprising:
retrieving first data from a first knowledge representation in the plurality of knowledge representations;
retrieving second data from a second knowledge representation in the plurality of knowledge representations; and semantically matching a first entity of the at least two entities defined by the first knowledge representation with a second entity of the at least two entities defined by the second knowledge representation.

12. The method of claim 11, wherein:

the first entity of the first knowledge representation defines a first parameter as a value;

the second entity of the second knowledge representation defines the first parameter as a variable; and the generating the answer further comprises setting the variable equal to the value.

13. The method of claim 1, the retrieving data from the knowledge base further comprising:

retrieving first data from a first knowledge representation in the third subset of the plurality of knowledge representations that describes step-by-step instructions for a project currently being worked on by a user who asked the natural language question, the first data identifying at least one step that is required to complete the project currently being worked on by the user.

14. The method of claim 13, the generating the answer further comprising:

generating the answer including a description of the at least one step that is required to complete the project currently being worked on by the user.

15. The method of claim 14, further comprising:

semantically matching, with the processor, a first entity of the at least two entities defined by the first knowledge representation that describes the at least one step with a second entity of the at least two entities defined by a second knowledge representation in the second subset of the plurality of knowledge representations that describes an action corresponding to the at least one step.

16. The method of claim 15, the retrieving data from the knowledge base further comprising:

retrieving second data from the second knowledge representation, the second data describing the action corresponding to the at least one step.

17. The method of claim 16, the generating the answer further comprising:

generating the description of the at least one step based on a combination of the first data and the second data.

18. The method of claim 1, wherein:

the query template has at least one blank; and the retrieving data from the knowledge base further comprises filling the at least one blank in the query template based on the natural language question.

19. The method of claim 1, further comprising:

storing, in the memory of the server, a taxonomy having (i) a first plurality of terms describing objects including at least one of tools, accessories for the tools, and materials, and (ii) a second plurality of terms describing actions that can be performed with the at least one of the tools, the accessories for the tools, and the materials; and matching words used in the natural language question with at least one of (i) terms in the first plurality of terms of the taxonomy and (ii) terms in the second plurality of terms of the taxonomy.

20. The method of claim 1, the generating the answer further comprising:

generating the answer as a combination of at least two of a text string, an audio, a video, and an image.

* * * * *